US006366197B1

(12) United States Patent
Tarquinio

(10) Patent No.: US 6,366,197 B1
(45) Date of Patent: Apr. 2, 2002

(54) TRANSPONDER SYSTEM

(75) Inventor: Vincent Tarquinio, Bulleen (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,110

(22) PCT Filed: Dec. 7, 1998

(86) PCT No.: PCT/DE98/03577

§ 371 Date: Aug. 22, 2000

§ 102(e) Date: Aug. 22, 2000

(87) PCT Pub. No.: WO99/29543

PCT Pub. Date: Jun. 17, 1999

(30) Foreign Application Priority Data

Dec. 8, 1997 (AU) ............................................. PP0775
Sep. 14, 1998 (AU) ............................................. 84223/98

(51) Int. Cl.[7] ................................................ B60R 25/10
(52) U.S. Cl. ...................... 340/426; 340/457; 307/10.1; 307/10.2; 180/287
(58) Field of Search ................................. 340/457, 426, 340/438, 428, 430, 425.5, 439, 539; 307/10.1, 10.2, 10.5, 10.6; 180/273, 287; 70/263

(56) References Cited

U.S. PATENT DOCUMENTS 5,659,291 A * 8/1997 Kennedy et al. ............. 340/457
5,874,889 A * 2/1999 Higdon et al. ............... 340/426
6,259,362 B1 * 7/2001 Lin ............................. 340/457

FOREIGN PATENT DOCUMENTS

DE 195 34 416 A 3/1997
EP 0 714 810 A 6/1996

* cited by examiner

Primary Examiner—Anh La
(74) Attorney, Agent, or Firm—Kenyon & Kenyon

(57) ABSTRACT

A transponder system for a motor vehicle includes a transponder that transmits an access signal as a response to a query signal, and a signal processing device that transmits the query signal and receives the access signal, which the transponder transmits in response to the query signal. The signal processing device transmits the query signal as a transponder check signal if the motor vehicle is deactivated, a warning signal being generated if the access signal is received in response to the transponder check signal.

20 Claims, 4 Drawing Sheets

TRANSPONDER SYSTEM

FIELD OF THE INVENTION

The present invention relates to a transponder system for a motor vehicle.

BACKGROUND INFORMATION

Motor vehicles are often furnished with an anti-theft security system, which uses a transponder system to determine when a vehicle immobilizer should be activated. A transponder, having stored in it an access identifier, is built into the ignition key of the motor vehicle. The ignition lock contains an antenna, which can be used for transmitting signals to the transponder and for receiving signals from the transponder if the key is inserted into the lock. The antenna is connected to the on-board electronics module (BEM) of the motor vehicle. The BEM transmits a query signal to the transponder, prompting the transponder to transmit the access identifier to the BEM. If the received access identifier is valid, then the BEM deactivates the vehicle immobilizer. The BEM queries the transponder at regular intervals as to the valid access identifier, and if it is not received, if, for example, the ignition key is no longer in the motor vehicle, then the BEM activates the vehicle immobilizer.

Although the system described above significantly increases the anti-theft protection of the motor vehicle, a problem has nevertheless arisen. Third parties having access to the ignition key, such as an auto dealer or an employee of a hotel valet parking service, may be able to remove the transponder from the ignition key without the knowledge of the vehicle owner. They then attach the transponder to the steering column or to the ignition lock housing, so that it is within the range of the ignition lock antenna but so that it cannot be seen by the driver. The ignition key or a copy of it is then returned to the owner, who naturally does not suspect that the transponder has been removed. The vehicle immobilizer is thereafter never activated because the transponder is always present. Therefore, it is possible for third parties to thereafter steal the motor vehicle using conventional techniques such as breaking in short-circuiting and the ignition system. A transponder system which overcomes this problem, or at least represents a viable alternative, is therefore desirable.

SUMMARY OF THE INVENTION

The present invention relates to a transponder system for a motor vehicle, in which the transponder transmits an access signal as a response to a query signal. A signal processing device is provided for transmitting the query signal and for receiving the access signal, which the transponder transmits in response to the query signal. The signal processing device transmits the query signal as a transponder check signal, if the motor vehicle is deactivated, a warning signal being generated if the access signal is received as a response to the transponder check signal.

BRIEF DESCRIPTION OF THE DRAWINGS

A preferred embodiment of the present invention is described below with reference to the attached drawings by way of example.

DETAILED DESCRIPTION

Figure 1:
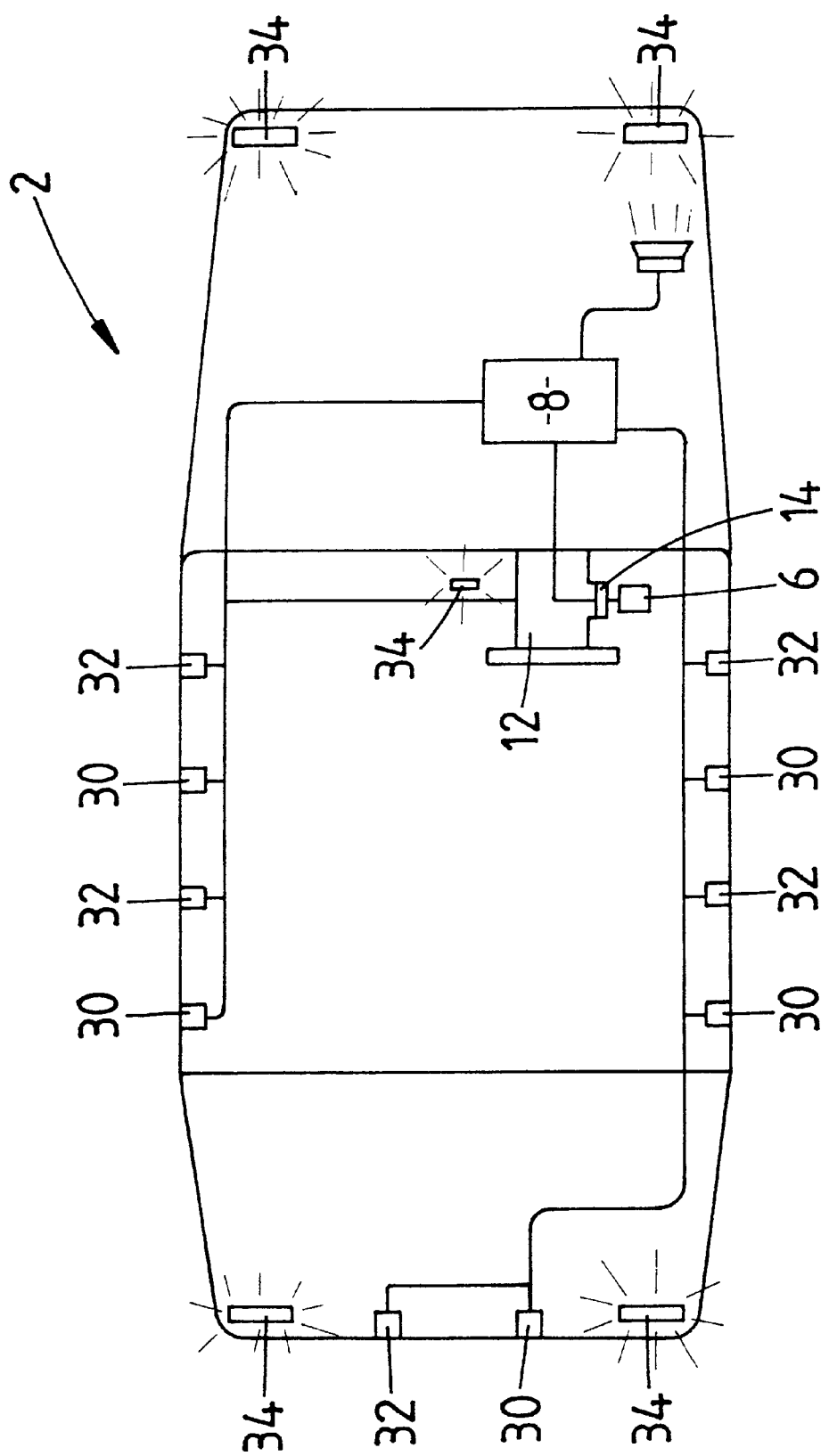
FIG. 1 is a block diagram of the transponder system for a motor vehicle.
Figure 2:
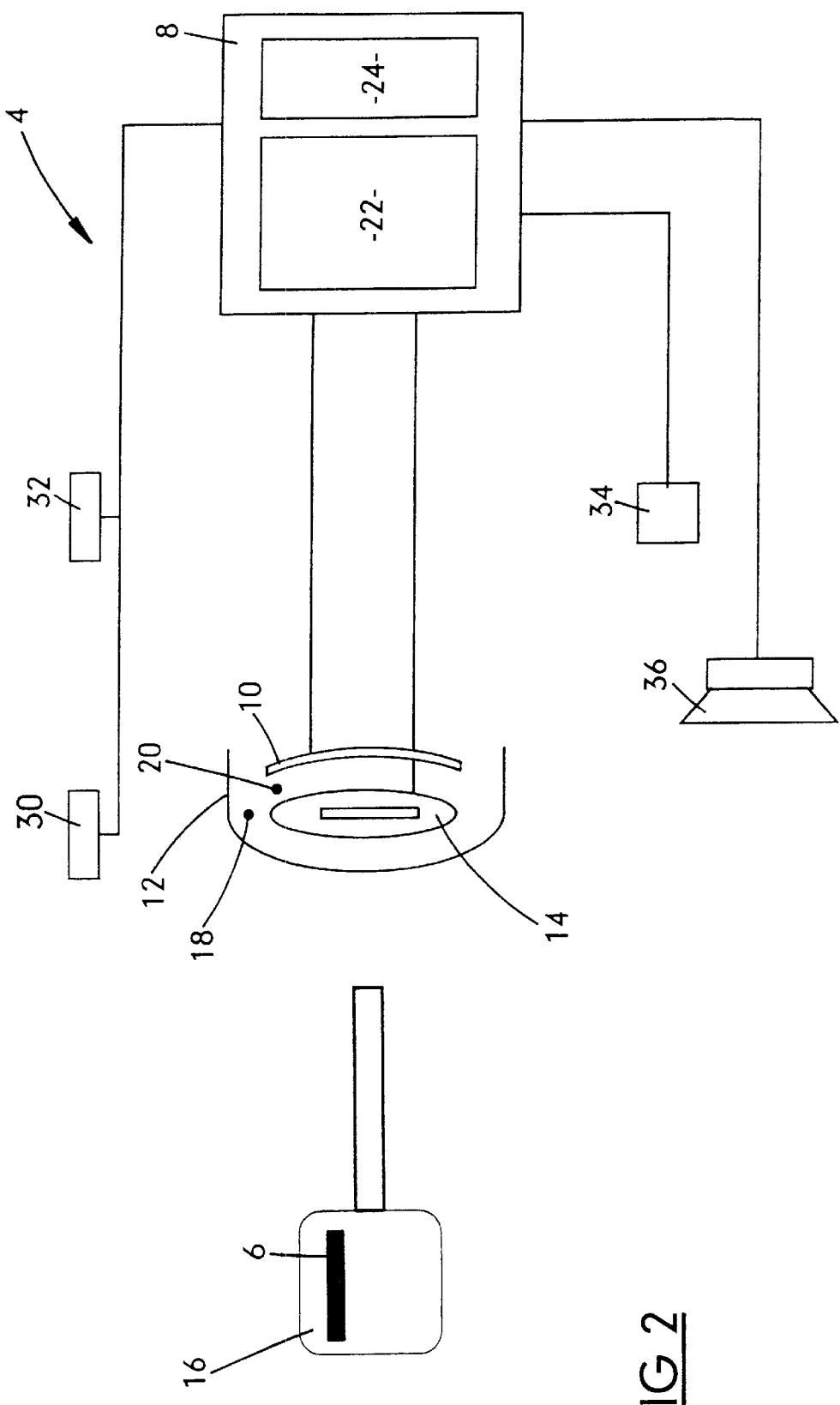
FIG. 2 is a schematic diagram of the transponder system.

A motor vehicle 2 has an anti-theft security system, which contains a transponder system 4 as depicted in the Figures. Transponder system 4 contains an electronic transponder 6 and an on-board electronics module (BEM) 8, which can communicate with each other via a transponder antenna 10 located inside steering column 12, next to ignition lock switch 14 of motor vehicle 2. Transponder 6, which is incorporated in ignition key 16 of motor vehicle 2, has an electronic access identifier stored in it. When the ignition key 16 is inserted into the lock cylinder of ignition lock switch 14, and when switch 14 is moved from an "OFF" position 18 to an "ON" position 20, which can be ACC or IGN, then the BEM transmits a query signal to antenna 10. If ignition key 16 is located in ignition lock switch 14, transponder 6 is within the transmission range of antenna 10 and the query signal activates the transponder 6, so that the latter sends the access identifier to antenna 10. The access identifier is received by BEM 8, which checks the identifier for its validity. If the access identifier is valid, the BEM generates a signal which causes the vehicle immobilizer to be deactivated. At regular intervals, BEM 8 queries transponder 6, to receive the access identifier, and if the access identifier is not received, BEM 8 generates a signal to activate the vehicle immobilizer. This will take place if key 16 is taken from ignition lock switch 14 and is beyond the range of antenna 10. BEM 8 contains a microprocessor 22, having control software is stored in electronic memory 24.

The components of transponder system 4, as described above, are known and are already component parts of motor vehicles. The following components are also already built into motor vehicles:

1. Door locking devices 30 for the locks of each door. Devices 30 are electromechanical devices, which are constructed so that they receive locking and unlocking signals for activating locking mechanisms in the corresponding doors of motor vehicle 2. The doors also include a trunk lid or tailgate.
2. Door contacts 32 for each motor vehicle door. Contacts 32 function to determine whether a door is open, in order to convey the corresponding signal to the vehicle electronics, so that corresponding units, such as the courtesy lights, are activated.
3. Signal displays 34. Signal displays 34 can be installed at various locations in the motor vehicle and are normally composed of lights that are switched on or activated by the vehicle electronics. Signal displays 34, for example, can also contain the left and right turn signal lights of motor vehicle 2.
4. An acoustical signal or warning signal 36, such as a siren.

In a preferred determines of the present invention, BEM 8 is connected to door locking devices 30, door contacts 32, and visual and acoustical displays 34 and 36, as depicted in the Figures, specifically either via the data bus of a LAN in motor vehicle 2 or via at least one of the cable harnesses of motor vehicle 2. The control program of BEM 8, for the reconfiguration of BEM 8, is modified such that the latter is able to operate as described below:

In addition to the normal query of transponder 6, BEM 8 also sends a query signal as a transponder check signal, if it determines that the person in possession of ignition key 16 has deactivated or switched off motor vehicle 2 and is getting ready to get out of the motor vehicle. BEM 8 also ascertains whether this determination has been made on the basis of signals that it can receive from switches, contacts, and sensors in motor vehicle 2, such as door locking device 30, door contacts 32, and ignition lock 14. If BEM 8 receives the access identifier signal as a response to the transponder check signal, then transponder 6 is still within range of antenna 10, although the person is getting ready to get out of the motor vehicle 2. This happens if the person has unintentionally left ignition key 16 in ignition lock 14, or in the most important case, if transponder 6 has been removed from ignition key 16 and has been attached to steering column 12 in the vicinity of antenna 10. If BEM 8 receives the access identifier as a response to the transponder check signal, it generates a warning signal, which is transmitted to at least one of the visual and acoustical warning displays 34 and 36, in order to alert the person. The person can then check whether ignition key 16 has been left in ignition lock 14 or whether in fact a potential thief has removed transponder 6 and has attached it to steering column 12.

BEM 8 can generate the transponder check signal upon detecting one of the following conditions:

1. The ignition lock switch 14 is in the "OFF" position 18 and the doors of the vehicle have just been locked, as BEM 8 determines the from the door locking signal received from, for example, door locking devices 30. The reception of the access identifier as a response causes BEM 8 to generate an alarm signal via signal displays 34 and/or 36. In this case, however, the transponder system cannot indicate a situation in which ignition key 16 has unintentionally been left in ignition lock 14 before motor vehicle 2 was locked. Instead, for this purpose it is necessary to have a key contact in the lock, to indicate whether the key was inserted. This type of key contact is already built into some motor vehicles.

2. Ignition lock switch 14 is in the "OFF" position 18 and at least one of the door contacts 32 was activated, indicating that one of the doors has been opened. In this case, transponder system 4 makes it unnecessary for a key contact to indicate that the key has been left in the lock. BEM 8 would cause a warning signal to be generated using displays 34 and/or 36. Since the warning signal can also be interpreted simply as meaning that the key has been left in ignition lock 14, although transponder 6 may have been removed and attached to steering column 12, BEM 8 can also react as described in paragraph 1, above. If the conditions described in paragraph 1, above are also fulfilled and the access identifier is received, then BEM 8 would transmit a heightened warning signal via signal displays 34 and/or 36, which would indicate that the alarm condition had escalated since the generation of the first alarm.

3. The ignition lock switch 14 is in the "Off" position 18 and an unlocking signal has been transmitted to unlock the doors of motor vehicle 2. BEM 8 therefore checks for the presence of transponder 6, before the person enters the motor vehicle and inserts key 16 into ignition lock 14. If it has been determined that transponder 6 is present, then transponder 6 has been removed by a potential thief from the key 16 and the corresponding warning signal is emitted via the signal displays 34 and/or 36. The unlocking signal can be received by remote control by BEM 8 or received via door locking devices 30.

4. The ignition lock switch 14 was previously in the "ON" position 20, was then placed in the "OFF" position 18 for a predetermined time period, and the key contact in the lock signals the removal of key 16.

Transponder system 4 described above is particularly advantageous because it checks the authorization of the user and also provides information as to whether transponder 6 has been removed from the key 16 by a potential thief and then placed within the range of antenna 10. System 4 can also be used in order to dispense with the key contact in ignition lock 14, which indicates whether the key has been left inserted. The result of eliminating this key contact is a reduction of manufacturing costs.

Figure 3:
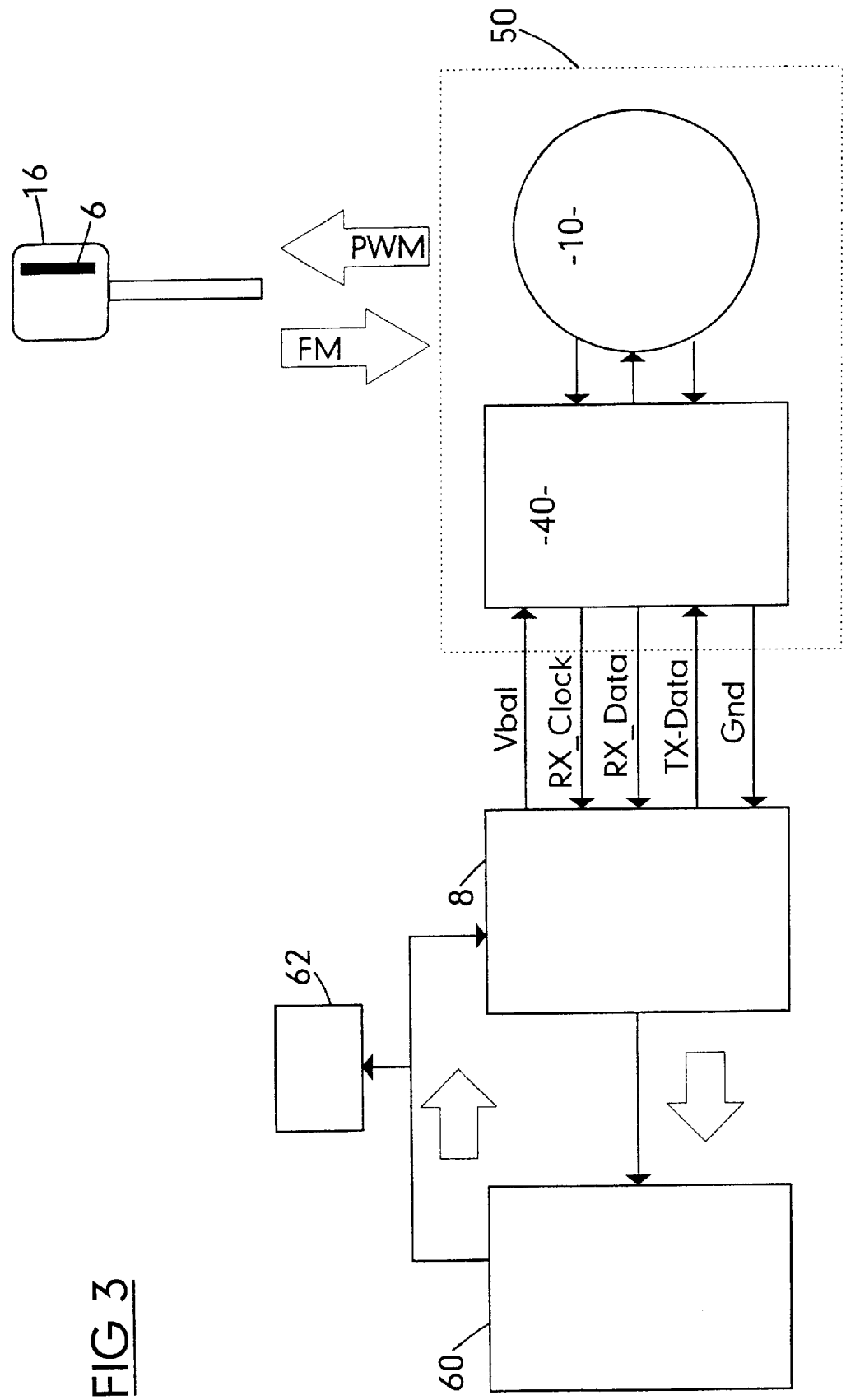
FIG. 3 is the block diagram of a part of the transponder system having an ignition-lock transmitting/receiving unit.
Figure 4:
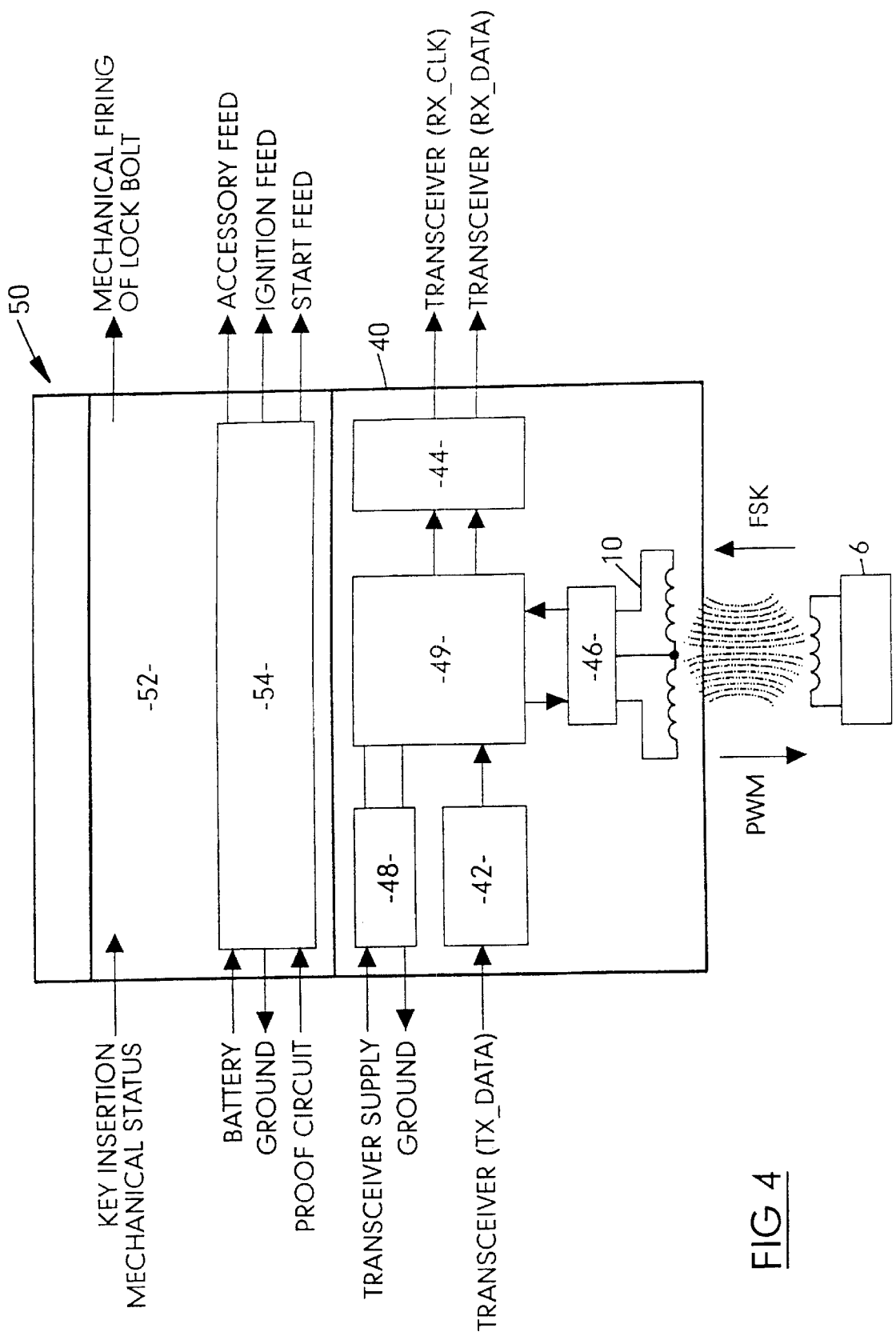
FIG. 4 is the block diagram of the ignition-lock transmitting/receiving unit.

Transponder system 4 can be realized through a radio transmitter-receiver 40, which provides an interface function between BEM 8 and a Tiris™ 23 mm glass digital signature transponder (DST) 6, which is built into a Tibbe™ ignition key 16, as is depicted in FIG. 3. DST 6 is a cryptographic device, which generates an encrypted access signal as a response to a request of a query signal. Antenna 10 is tapped in the middle and is a part of transmitter-receiver 40. Transmitter-receiver 40 is a part of an ignition lock unit (TILA) 50 (as in FIG. 4), which also contains steering wheel lock 52 and ignition switch 54. Transmitter-receiver 40 contains: (1) an input interface 42, to receive data that are transmitted by BEM 8; (2) an output interface 44, to convey received clock and data signals to BEM 8; (3) an antenna interface 46 for tapped antenna 10; and (4) a voltage regulator 48, to provide a regulated power supply for a main data-processing unit 49 of transmitter-receiver 40. TILA 50 is configured such that antenna 10 can be clamped onto a steering wheel lock without having to modify the existing steering column molding.

Transmitter-receiver 40 generates a magnetic field at a frequency of 134 kHz, being transmitted by antenna coil 10. The energy of the field activates DST 6 and transmits to DST 6 a pulse width modulated (PWM) data stream in the form of a modulated radio frequency signal. The energy transfer to and from DST 6 occurs using the half-duplex method, in which the transmissions follow each other. DST 6 stores the received energy in a capacitor, and this energy is then used to transmit a data stream back to transmitter-receiver 40 in a frequency modulation having frequency shift keying (FSK). The data transmitted to DST 6 are a random 40-bit request, and DST 6 responds with a 24-bit signature. Transmitter-receiver 40 demodulates the response signal and forwards the demodulated response data to BEM 8 for further processing. BEM 8 carries out an authorization checking procedure in coordination with a request/response protocol. The correct response can only be received if the cryptographic key is known both to BEM 8 as well as to DST 6. The encryption algorithm, which is the same in BEM 8 and DST 6, assures that the cryptographic key is concealed during the request and response. If the attempt is made to turn off the motor vehicle, BEM 8 generates a warning signal if it discovers an open door or an unlocked door, or if transponder 16 is in the vicinity of TILA 50. The latter condition signifies that either ignition key 16 has been left in lock 14, or transmitter-receiver 6 was left in the vicinity of TILA 50 for the purpose of stealing the motor vehicle, while the latter is unattended. This situation, in distinction from other situations, is indicated by the fact that a special acoustical signal is generated by the siren 36 and/or an LED 34 is activated in the vehicle interior.

BEM 8 can communicate with engine management system 60 of the motor vehicle and with status message display 62 built into the motor vehicle. The message display 62 may be a part of the instrument unit or separate from it. Status message display 62 functions to display messages to the driver or to a passenger. Engine management system 60 can be responsible for the activation of the vehicle immobilizer or for the granting of driver authorization. To determine whether the vehicle immobilizer is activated or the driver should receive driver authorization, the engine management system could ascertain whether an attempt has been made to start the vehicle, and if so, then a 32-bit request is sent to BEM 8. BEM 8, after evaluating the access identifier, simply sends, as a response to the request, a communication concerning the validity of the access identifier to engine management system 60. This information is conveyed to engine management system 60 as a 32-bit response.

Many modifications in this regard will occur to the worker skilled in the art without exceeding the scope of the present invention, as it has been described herein with reference to the accompanying drawings.

What is claimed is:

1. A system for a motor vehicle, the motor vehicle including at least one door and an ignition lock switch, the ignition lock switch having an OFF position, the system comprising:

a signal processing device transmitting a query signal; and a transponder transmitting an access signal in response to the query signal;

wherein the signal processing device transmits the query signal as a transponder check signal at least one of in response to the motor vehicle being switched off and in response to an unlocking signal being transmitted to unlock the door of the motor vehicle when the ignition lock switch is in the OFF position, the system generating a warning signal if the signal processing device receives the access signal in response to the transponder check signal.

2. The system according to claim 1, wherein the signal processing device transmits the transponder check signal if the ignition lock switch is in the OFF position and at least one door locking device of the motor vehicle has been brought into a locked condition.

3. The system according to claim 1, wherein the signal processing device transmits the query signal as a first transponder check signal in response to the motor vehicle being switched off and at least one door being open, the signal processing device generating a first warning signal if the access signal has been received in response to the transponder check signal.

4. The system according to claim 2, wherein the signal processing device transmits the first transponder check signal if at least one of the ignition lock switch is in the OFF position and a door contact of the motor vehicle is in an open position, the signal processing device generating a first warning signal if the access signal is received in response to the first transponder check signal.

5. The system according to claim 3, wherein the warning signal is elevated into an alarm signal in connection with the first warning signal.

6. The system according to claim 4, wherein the warning signal is elevated into an alarm signal in connection with the first warning signal.

7. The system according to claim 1, wherein the signal processing device transmits the transponder check signal when the motor vehicle is switched off and at least one of the doors is open.

8. The system according to claim 1, wherein the signal processing device transmits the transponder check signal if the ignition switch is in the OFF position and a door contact of the motor vehicle is in an open position.

9. The system according to claim 1, wherein the signal processing device transmits the transponder check signal when the motor vehicle is switched off and an ignition key is withdrawn from the ignition lock switch.

10. The system according to claim 1, wherein the signal processing device transmits the transponder check signal when the motor vehicle is switched off and unlocked.

11. The system according to claim 1, wherein the signal processing device transmits the transponder check signal for a preselected time period after the motor vehicle is switched off.

12. The system according to claim 11, wherein the preselected time period is measured beginning after the motor vehicle is switched off and after an ignition key is withdrawn from the ignition lock switch.

13. The system according to claim 1, wherein the signal processing device includes an on-board electronics module connected to an antenna.

14. The system according to claim 13, wherein the antenna is integrated into a part of the motor vehicle.

15. The system according to claim 14, wherein the part of the motor vehicle is a steering column.

16. The system according to claim 13, wherein the signal processing device includes a transmitter-receiver, the transmitter-receiver containing the antenna and connected to the on-board electronics module.

17. The system according to claim 16, wherein the transmitter-receiver generates a magnetic field, the magnetic field providing energy to the transponder for transmitting the query signal, the magnetic field receiving the access signal.

18. The system according to claim 17, wherein at least one of the query signal and the access signal contains encrypted data.

19. The system according to claim 1, wherein the signal processing device is connected to at least one door locking device of the motor vehicle.

20. The system according to claim 1, wherein the signal processing device is connected to at least one door contact of the motor vehicle.

* * * * *

UNITED STATES PATENT AND TRADEMARK OFFICE
CERTIFICATE OF CORRECTION

PATENT NO. : 6,366,197 B1  
DATED : April 2, 2002  
INVENTOR(S) : Vincent Tarquinio It is certified that error appears in the above-identified patent and that said Letters Patent is hereby corrected as shown below:

Column 2,  
Line 54, change "preferred determines" to -- preferred embodiment --

Column 3,  
Line 51, change "off" to -- OFF --

Signed and Sealed this

Ninth Day of September, 2003

JAMES E. ROGAN  
*Director of the United States Patent and Trademark Office*